United States Patent
Gualteri et al.

(10) Patent No.: US 12,415,638 B2
(45) Date of Patent: Sep. 16, 2025

(54) METHOD AND AN APPARATUS FOR PACKAGING ARTICLES

(71) Applicants: Fameccanica.Data S.p.A., San Giovanni Teatino (IT); PAUL HARTMANN AG, Heidenheim (DE)

(72) Inventors: Diego Gualteri, San Giovanni Teatino (IT); Renzo Blasioli, San Giovanni Teatino (IT); Asti Radovani, San Giovanni Teatino (IT); Marc Rodriguez, Mataró (ES); Jordi Mateu, Mataró (ES); Thomas Lüttgens, Heidenheim (DE)

(73) Assignees: Fameccanica.Data S.p.A., San Giovanni Teatino Chieti (IT); PAUL HARTMANN AG, Heidenheim (DE)

( * ) Notice: Subject to any disclaimer, the term of this patent is extended or adjusted under 35 U.S.C. 154(b) by 0 days.

(21) Appl. No.: 18/248,761

(22) PCT Filed: Jun. 11, 2021

(86) PCT No.: PCT/EP2021/065777
§ 371 (c)(1),
(2) Date: Apr. 12, 2023

(87) PCT Pub. No.: WO2022/078636
PCT Pub. Date: Apr. 21, 2022

(65) Prior Publication Data
US 2024/0034495 A1    Feb. 1, 2024

(30) Foreign Application Priority Data
Oct. 15, 2020 (EP) .................................... 20201966

(51) Int. Cl.
*B65B 9/00* (2006.01)
*B65B 9/04* (2006.01)
(Continued)

(52) U.S. Cl.
CPC ............... *B65B 9/04* (2013.01); *B65B 47/02* (2013.01); *B65B 47/04* (2013.01); *B65B 51/026* (2013.01); *B65B 51/16* (2013.01)

(58) Field of Classification Search
CPC .......... B65B 9/04; B65B 47/02; B65B 51/14; B65B 51/16; B65B 61/14; B65B 51/02; B65B 51/10; B65B 11/10
(Continued)

(56) References Cited

U.S. PATENT DOCUMENTS 4,614,076 A * 9/1986 Rathemacher ..... B65D 75/5855
53/511
5,613,601 A * 3/1997 Boulanger .......... B29C 66/8242
206/0.5
(Continued)

FOREIGN PATENT DOCUMENTS

| EP | 0642988 | A1 | 3/1995 | |
|---|---|---|---|---|
| EP | 0916476 | A1 * | 5/1995 | ............. B29C 65/00 |
| GB | 902769 | A | 8/1962 | |

OTHER PUBLICATIONS

International Searching Authority document and annex dated Sep. 7, 2021. 13 pages.
Chinese Office Action dated May 1, 2024. 9 pages.

*Primary Examiner* — Jacob A Smith
(74) *Attorney, Agent, or Firm* — RMCK Law Group PLC

(57) ABSTRACT

A method and an apparatus for forming packages including plasters enclosed between two opposite flexible sheets having their edges joined by means of a thermally-activated adhesive.

10 Claims, 3 Drawing Sheets

(51) Int. Cl.
  *B65B 47/02* (2006.01)
  *B65B 47/04* (2006.01)
  *B65B 51/02* (2006.01)
  *B65B 51/16* (2006.01)
(58) Field of Classification Search
  USPC ......... 53/450, 442, 135.3, 412, 134.1, 137.2
  See application file for complete search history.

(56) References Cited

U.S. PATENT DOCUMENTS

| | | | |
|---|---|---|---|
| 10,420,704 B2* | 9/2019 | Uetake | B65B 47/04 |
| 2004/0173492 A1* | 9/2004 | Kane, Jr. | B65D 33/2533 |
| | | | 53/139.2 |
| 2016/0128903 A1* | 5/2016 | Uetake | B65B 47/02 |
| | | | 53/131.2 |

* cited by examiner

METHOD AND AN APPARATUS FOR PACKAGING ARTICLES

CROSS-REFERENCE TO RELATED APPLICATIONS

This application is a 371 National Stage of International Application No. PCT/EP2021/065777, filed Jun. 11, 2021, which claims priority to European Patent Application No. 20201966.7 filed Oct. 15, 2020. The disclosure of each of the above applications is incorporated herein by reference in its entirety.

FIELD OF THE INVENTION

The present invention relates in general to the packaging of articles, in particular of flat articles, articles having a thickness lower than the other dimensions, as well as folded articles whose resulting thickness is lower than the other overall dimensions of the folded article.

More precisely, the invention relates to a method and an apparatus for forming packages comprising articles enclosed between two opposite flexible sheets having their edges joined by means of a thermally-activated adhesive.

The invention was developed, in particular, with a view to its application in the field of packaging plasters, such as, for example, plasters for covering wounds, medicated plasters, pain-relieving plasters, heating plasters with and without medicaments.

In the following description, reference will be made to this specific field of use without however losing generality.

DESCRIPTION OF THE PRIOR ART

In the medical field there are different types of plasters. In many cases, these products are boxed without being wrapped. In some cases, the plasters are packaged individually in envelope-shaped packages before being boxed.

Individual packaging of the plasters is carried out by enclosing the individual plasters between two flexible sheets overlapping each other that enclose a respective plaster like a sandwich, and are joined together at their edges by means of adhesive. Typically, in this field the adhesive used is a thermally-activated adhesive because it guarantees stable fixing of the sheets so that the articles are protected from external agents. Thanks to these thermally-activated adhesives, once the package is opened, it is no longer resealable, and this allows the health and hygiene standards relating to the marketing of plasters or other similar articles to be met. The packages may be formed by two sheets of paper or by a sheet of paper and by a sheet of plastic material, as well as by two sheets of plastic material. For example, the plastic material may be transparent such as polyethylene. Often the packages of plasters are formed by a sheet of paper having an outer surface on which information relating to the product is printed, and by a sheet of transparent plastic material. Typically, the sheet of paper or one of the two sheets of paper has an inner surface on which a thermally-activated adhesive is applied, for example, on the inner surface there may be a layer of adhesive, optionally shaped. The sheet provided with the thermally-activated adhesive may be a layered material already provided with an adhesive.

In apparatus according to the prior art, the packaging of the plasters between two flexible sheets is carried out by advancing a continuous array of plasters along a machine direction, spaced apart from each other, and two continuous flexible sheets overlapping each other on opposite sides of the continuous array of plasters, one of which has a layer of thermally-activated adhesive, so as to form a continuous composite tape consisting of the two continuous flexible sheets and the continuous array of plasters sandwiched between the two continuous flexible sheets. The packages are closed by passing the continuous composite tape through a first and a second pair of possibly heated pressure rollers. Typically, the first pair of pressure rollers carries out two continuous longitudinal welds between the two flexible sheets, and the second pair of pressure rollers carries out welds transversal to the feed direction of the tape located between each pair of articles.

The fixing between the two flexible sheets takes place by activating the thermally-activated adhesive, which occurs while the flexible sheets are compressed together along the compression lines.

Subsequently, the packages are obtained from the continuous composite tape by means of suitable cuts transversal to the feed direction, typically between the transverse welds between each pair of articles.

The welding between the two flexible sheets must meet precise quality requirements defined by the plaster manufacturers. The quality specifications are as follows:

from the point of view of visual appearance: there must be a clear transfer of the adhesive material from one sheet to another, the welding joint must be complete and clean, without impurities and without apparent damage, the color of the packaging sheets must not change due to the welding process, and the packaging sheets must not be noticeably deformed due to the welding process;

from the point of view of the sealing of the weld: the release force (peeling) must be within a precise quantified range, and during opening of the package there must be no variations in the release force outside defined thresholds between one area and the other, or between different packages;

from the point of view of sealing of the weld and of the hygiene-sanitary standards: welding of the package must be such that the product is in an environment wherein any contaminants cannot access from the outside of the package, and also such as to guarantee the absence of leakage of substances from the inside (a leak test is performed by placing a colored liquid inside a package and monitoring for any spills).

One of the main problems of the apparatuses according to the prior art is that the current maximum speed of the packaging equipment is in the order of 50-60 m/min. This speed limit is due to the fact that as the speed of the machine increases, the pressure rollers are unable to give the flexible sheets sufficient energy to allow the correct transfer of the adhesive material from one sheet to another because the contact time is proportionally reduced between the pressure rollers and the sheets. In this context, increasing the speed of the apparatuses beyond the limit of 50-60 m/min would compromise the quality requirements prescribed by the plaster manufacturers.

U.S. Pat. No. 5,613,601A discloses a method and apparatus for heat-sealing dispensing packages comprising a water permeable bag formed by two non-woven webs which enclose predetermined quantities of a particulate product, such as tea or coffee that releases a flavoring substance in steeping liquid. The non-woven webs have a thermally activated bonding surface permitting to permanently close the bag by peripherally heat-sealing the bag walls to one another. The step of enclosing the predetermined quantity of particulate product between the two non-woven webs and the step of compressing to each other the two non-woven webs are performed simultaneously in the same unit.

The solution disclosed in U.S. Pat. No. 5,613,601A is directed to manufacturing coffee or tea bags and would not be suitable to meet the quality specifications required by plaster manufacturers and does not allow to reach high production velocity.

OBJECT AND SUMMARY OF THE INVENTION

The object of the present invention is to provide a method and an apparatus for packaging articles enclosed between two opposite flexible sheets, joined together by means of a thermally-activated adhesive, which allow the production speed to be increased without compromising the quality requirements of the packages.

According to the present invention, this object is achieved by a method and by an apparatus having the characteristics forming the subject of the independent method and apparatus claims.

The present invention envisages carrying out heating of the flexible sheets before compressing the sheets that enclose the articles.

It has been experimentally verified that the preliminary heating of the flexible sheets to a temperature in the order of 70-80° C. allows speeds to be reached of the welding process in the order of 200 m/min in full compliance with the quality standards required by manufacturers. It is clear that this entails a consequent increase in production even by four times with respect to the prior art, maintaining if not improving the current quality parameters mentioned above.

According to the present invention, the method for packaging articles comprises:
  enclosing the articles between two opposite flexible sheets, wherein at least one of which has a thermally-activated adhesive on its surface facing the other sheet,
  compressing the sheets to fix the sheets together around the articles by means of the thermally-activated adhesive,
  wherein the method involves heating at least one of the sheets before compressing the sheets.

In accordance with possible embodiments, at least one of the sheets is heated before enclosing the articles between the sheets.

This aspect allows activating the thermally-activated adhesive without simultaneously heating the articles as occurs in the prior art, wherein the sheets are fixed and heated simultaneously to enclose the articles.

Thanks to this aspect, it is also possible to heat at least one sheet to a higher temperature and for a longer time than the prior art, wherein the temperature is limited by the presence of the article and the time is restricted to the fixing time of the sheets.

According to possible embodiments, at least one of the sheets is heated exclusively along areas of the sheet which are intended to be compressed.

This aspect allows concentrating the energy exchange and only activating the thermally-activated adhesive in the areas intended to be compressed, avoiding heating of other areas wherein the thermally-activated adhesive may block or contaminate the article when activated.

These embodiments may be implemented using rollers configured to exclusively heat the areas intended to be compressed. For example, it is possible to use rollers having suitably shaped heating areas that transmit heat.

In accordance with possible embodiments, the sheets are compressed exclusively around each of the articles.

This aspect avoids compressing the articles, and also allows concentrating the compression action at the previously activated thermally-activated adhesive. For example, it is possible to perform a thermal activation of the thermally-activated adhesive in phase with the corresponding compression.

The temperatures to which the sheets are heated can be different depending on one or more of the following parameters: the material the sheet is made of, the dimensions of the sheet, the face of the sheet from which the heat is transferred, the type of thermally-activated adhesive used and its extension on the sheet, the position along the feed path where the sheet is heated, the feed rate of the sheet, the number of heating stations foreseen along the path and the ambient temperature where the production takes place.

In accordance with possible embodiments, both sheets are heated on their respective faces opposite to the faces intended to be turned towards the articles.

This aspect allows optimizing the adhesion of the thermally-activated adhesive from one sheet to the other, as the adhesive adheres to the surface of the sheet at a higher temperature than the temperature it would have had without being heated. In this context, the thermally-activated adhesive can adhere more effectively to the surface of the other heated sheet because the temperature of the latter allows the thermally-activated adhesive to be kept activated for a longer time than the time in which the thermally-activated adhesive would remain active once in contact with the surface of the other unheated sheet.

Furthermore, by heating the sheets on their respective faces opposite to the faces intended to be turned towards the articles allows activation of the thermally-activated adhesive gradually, starting from the area in contact with the sheet up to the surface area. This prevents the surface area of the thermally-activated adhesive from being heated directly and, therefore, from being subjected to excessive temperature for a prolonged time.

According to the present invention, the apparatus for packaging articles comprises:
  an overlapping unit configured to apply two flexible sheets on opposite sides of the articles, so as to enclose the articles between the sheets,
  a compression unit configured to compress the sheets at compression areas,
  optionally an in-line dispenser configured to apply thermally-activated adhesive upstream of the overlapping unit,
  optionally a cutting module located downstream of the compression unit,
  wherein the apparatus comprises at least one heating unit configured to heat at least one of the sheets upstream of the compression unit.

According to possible embodiments, the overlapping unit comprises two coupling rollers with their respective axes parallel to each other and configured to apply the sheets on opposite sides of the articles, wherein at least one heating unit is arranged inside at least one of said coupling rollers. With respect to these possible embodiments, an additional heating source, in particular an infrared heating source, may be present between the overlapping unit and the compression unit.

In accordance with possible embodiments, at least one area of the outer surface of at least one of the coupling rollers is heated and is in phase with corresponding compression areas of the compression unit.

In accordance with possible embodiments, the articles to be packaged may be arranged in at least two rows advancing simultaneously through an overlapping unit configured to apply two flexible sheets on opposite sides of the least two rows of articles, so that at least two articles may be packaged simultaneously side by side.

According to possible embodiments, the heating unit arranged inside at least one of said coupling rollers may be arranged on only a defined portion of the circular sector of the heating roller, e.g. 120°.

The portion of circular sector of the coupling roller covered by the web may be different as a function of the diameter of the roller. In particular, with a diameter of the coupling roller of 200 mm the circular sector covered by the web may be 221°, with a diameter of the coupling roller of 220 mm the circular sector covered by the web may be 227°, with a diameter of the coupling roller of 150 mm the circular sector covered by the web may be 150°.

The range of the circular sector covered by the web may be comprised between 30° and 240°, preferably between 140° and 240°. The range of the diameter of the coupling roller may be comprised between 140 mm and 300 mm, preferably between 140 mm and 250 mm.

According to possible embodiments, the compression unit comprises a single pressure roller or a single pair of pressure rollers configured to compress the sheets around each of the articles.

According to a preferred embodiment, the apparatus for packaging articles comprises an overlapping unit configured to apply two flexible sheets on opposite sides of the articles, so as to enclose the articles between the sheets, wherein the overlapping unit comprises two coupling rollers with their respective axes parallel to each other and configured to apply the sheets on opposite sides of the articles, wherein at least one heating unit is arranged inside at least one of said coupling rollers. The coupling rollers are configured to exclusively heat the areas intended to be compressed, in particular by having suitably shaped heating areas that transmit heat. The apparatus further comprises a compression unit configured to compress the sheets at compression areas, wherein the compression unit comprises a single pair of pressure rollers configured to compress the sheets around each of the articles.

BRIEF DESCRIPTION OF THE DRAWINGS

The present invention will now be described in detail with reference to the attached drawings, given purely by way of non-limiting example, wherein.

DETAILED DESCRIPTION

Figure 1A:
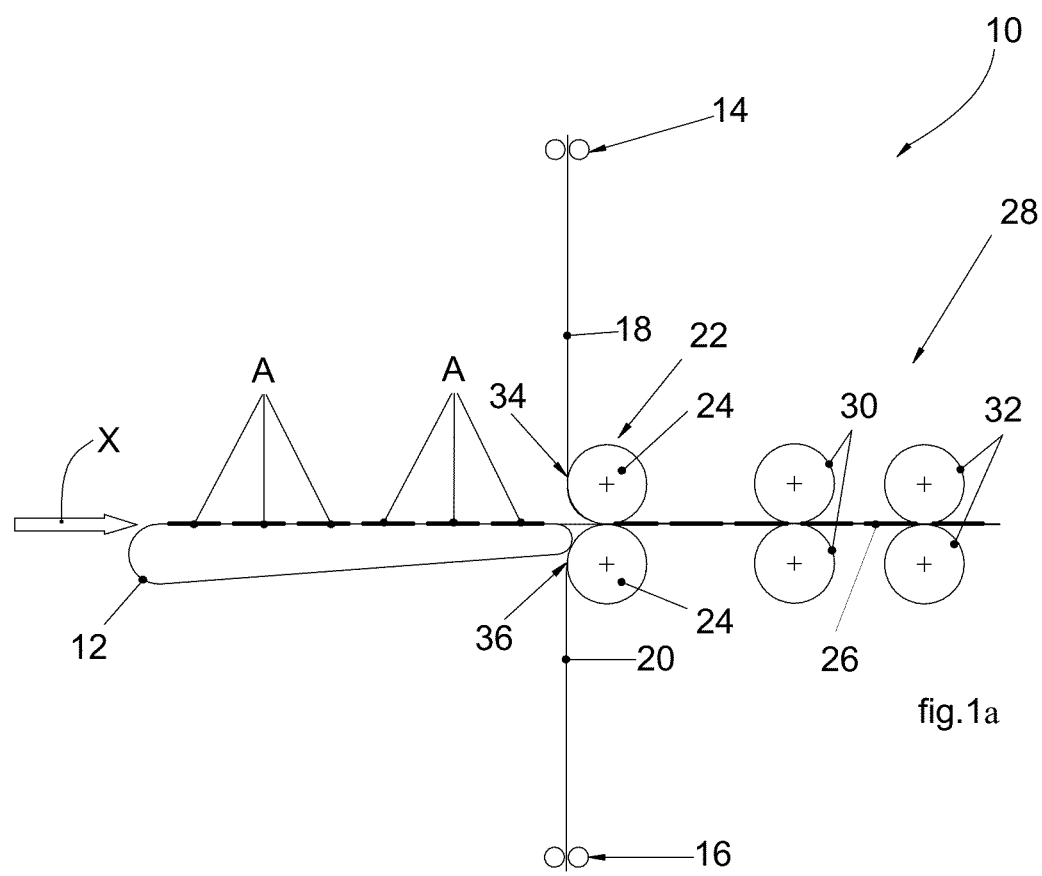
FIGS. 1a and 1b are schematic views of two embodiments of an apparatus for packaging articles according to the present invention.

With reference to FIG. 1a, reference 10 indicates an apparatus for packaging flat articles A in envelope-shaped packages closed around each article A along the edges of the packages.

The articles A may be wound-covering plasters, medicated plasters, pain-relief plasters, heating plasters, and the like.

The articles A are aligned and spaced apart from each other in a continuous array that advances in a machine direction X on an inlet conveyor 12.

The apparatus 10 comprises a first feeding assembly 14 and a second feeding assembly 16 that feed, respectively, a first continuous flexible sheet 18 and a second continuous flexible sheet 20 towards an overlapping unit 22. The two continuous flexible sheets 18, 20 can both be of paper or one of the two sheets can be of paper and the other sheet can be of plastic material, or they can both be of plastic material, for example, transparent plastic material such as polyethylene. One of the two sheets 18, 20 comprises a thermally-activated adhesive. In the case wherein one of the two continuous flexible sheets 18, 20 is made of paper and the other of plastic material, the thermally-activated adhesive is placed on the paper sheet.

One of the two continuous flexible sheets 18, 20 can be a layered material already equipped with a thermally-activated adhesive. In other embodiments, the thermally-activated adhesive may be applied in-line using an adhesive dispenser. The thermally-activated adhesive layer may be applied or already present on the entire surface of the flexible sheet. The thermally-activated adhesive has no adhesive characteristics until it is heated above a preset temperature (activation temperature) for a preset time. After applying pressure, the thermally-activated adhesive fixes its state and, typically, even if heated again to the activation temperature, it no longer changes its state.

According to possible embodiments, the overlapping unit 22 comprises two coupling rollers 24 tangential to each other and rotatable in opposite directions around respective axes parallel to each other and perpendicular to the machine direction X.

The two continuous flexible sheets 18, 20 are kept in contact with the outer surfaces of the respective coupling rollers 24 while they advance towards the tangency area of the two rollers. The articles A are fed in the direction X between the two continuous flexible sheets 18, 20 towards the tangency area between the two coupling rollers 24. The two flexible sheets 18, 20 are superimposed on each other on opposite sides with respect to the articles A while passing through the tangency area of the two coupling rollers 24.

Downstream of the overlapping unit 22, a continuous composite tape 26 is formed comprising two continuous flexible sheets 18, 20 superimposed on each other, and a continuous array of articles A spaced apart longitudinally from each other and sandwiched between the two continuous flexible sheets 18, 20. One of the two continuous flexible sheets 18, 20 has a layer of thermally-activated adhesive arranged on its surface facing the other sheet.

The apparatus 10 comprises a compression unit 28 configured to fix the two continuous flexible sheets 18, 20 together following the activation of the thermally-activated adhesive along fixing lines that extend around the individual articles A.

According to a feature of the present invention, the overlapping unit 22 and the compression unit 28 are two separate modules independent of each other, so that the steps of overlapping and compressing the two continuous flexible sheets 18, 20 are separate. In particular, the compression step is carried out when the step of enclosing the articles A between the flexible sheets 18, 20 is completed, so that the articles are completely enclosed between the flexible sheets 18, 20 when the compression step is carried out.

In the example illustrated in FIG. 1, the compression unit 28 comprises a first pair of pressure rollers 30 and a second pair of pressure rollers 32. The first pair of pressure rollers 30 compresses the two continuous flexible sheets 18, 20 superimposed on each other along two continuous longitudinal lines parallel to the machine direction X and arranged on opposite sides with respect to the continuous array of articles A. The second pair of pressure rollers 32 compresses the continuous flexible sheets 18, 20 together along lines transverse to the machine direction X and located between each pair of adjacent articles A.

In a possible embodiment, the compression unit 28 may advantageously comprise a single pair of pressure rollers 30 configured to compress the continuous flexible sheets 18, 20 together along closed paths surrounding respective articles A. One of the two pressure rollers 30 may have compression areas on its outer surface having a closed shape intended to compress the sheets 18, 20 together around each article A. For example, the compression area may comprise a closed protruding shaped profile. For example, the compression area may define a closed polygon shape. In a possible embodiment, at least one of the pressure rollers 30 may have one or more compression areas comprising soft material, such as, for example, silicone. Some experimental tests carried out have shown that the combination of a pressure roller 30 having one or more protruding compression areas made of soft material, such as silicone, and a pressure roller 30 made of hard material, such as steel, allow fixing the sheets together efficiently, as the previously activated thermally-activated adhesive is compressed and made to adhere gradually and uniformly at the compression areas defined by the compression areas around each article A. In one or more embodiments, one of the two pressure rollers 30 may have an outer surface provided with silicone compression areas and the other of the two pressure rollers 30 may have an outer surface of hard material (for example, steel).

The apparatus 10 comprises at least one heating unit configured to heat at least one of the continuous flexible sheets 18, 20 upstream of the compression unit 28.

In the example illustrated in FIG. 1a, the apparatus 10 comprises an overlapping unit 22 provided with a first heating unit 34 and a second heating unit 36.

The heating units 34, 36 may be typical heating units in the sector that use fluids and/or electrical resistors to heat the surface interacting with the flexible sheets 18, 20 and/or the continuous composite tape 26 to heat them.

The heating units 34, 36 are configured to heat the continuous flexible sheets 18, 20 to a temperature between 60-100° C. In a preferred embodiment, the heating units are configured to heat the respective continuous flexible sheets 18, 20 to a temperature between 70-80° C.

According to possible embodiments, heating of the continuous flexible sheets 18, 20 may not completely activate the thermally-activated adhesive so that the articles A are not glued to the sheet provided with the layer of thermally-activated adhesive, for example, when they are sandwiched between the two continuous flexible sheets 18, 20 in the overlapping unit 22 or, subsequently, in the continuous composite tape 26 upstream of the compression unit 28.

According to possible embodiments, thermal activation of the thermally-activated adhesive may be completed by heating the compression unit 28.

According to possible embodiments, heating of the continuous flexible sheets 18, 20 in the at least one heating unit 34, 36 may fully activate the thermally-activated adhesive, so that the compression unit 28 compresses the two continuous flexible sheets 18, 20 without further heating the already activated thermally-activated adhesive.

During the passage through the compression unit 28, the preliminary heating of the continuous flexible sheets 18, 20 allows obtaining activation of the thermally-activated adhesive with much higher speeds than those possible in the absence of preliminary heating. It has been experimented that by heating the continuous flexible sheets 18, 20 to temperatures in the order of 70-80° C., it is possible to advance the continuous composite tape 26 through the compression unit 28 at speeds in the order of 200 m/min, resulting in packages that meet all the quality requirements defined by the plaster manufacturers, in particular, uniform transfer of the thermally-activated adhesive to the sheet without the adhesive layer, optimal sealing of the weld, a uniform release force and the guarantee of absence of leaks.

Figure 2:
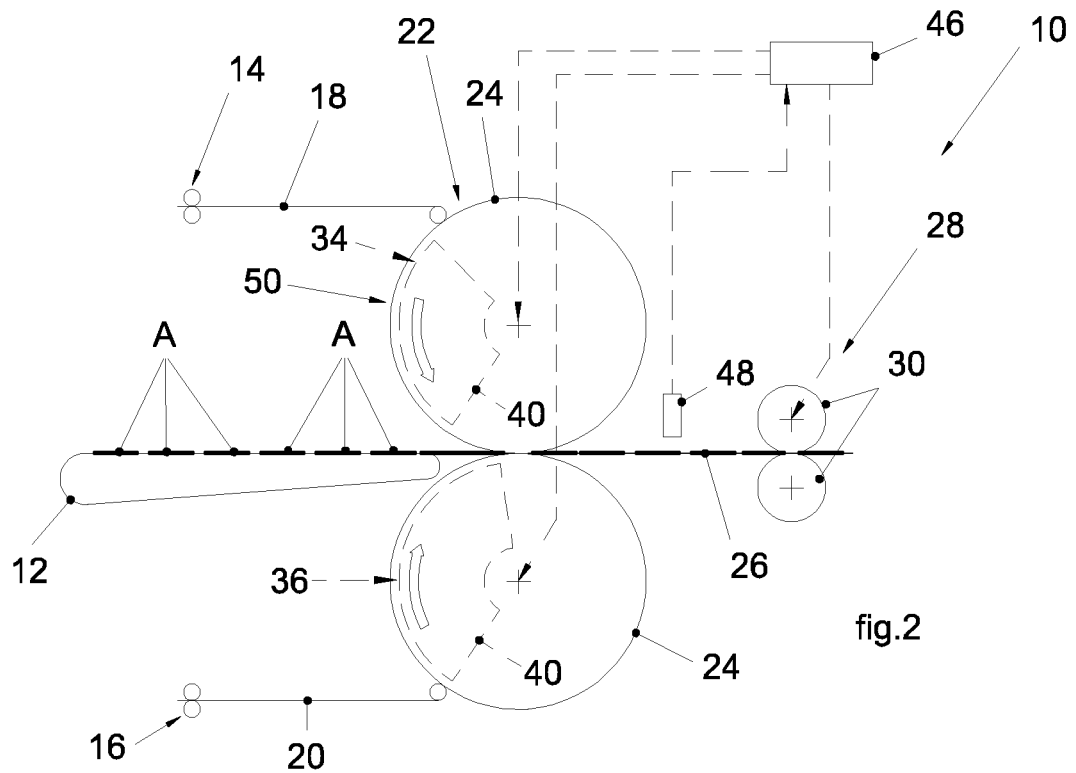
FIG. 2 is a schematic view of another embodiment of an apparatus for packaging articles according to the present invention.

FIG. 2 illustrates an embodiment of an apparatus 10 according to the present invention. The elements corresponding to those previously described are indicated with the same numerical references.

In the embodiment illustrated in FIG. 2, the heating units 34, 36 that heat the respective continuous flexible sheets 18, 20 are located inside the coupling rollers 24 of the overlapping unit 22.

The continuous flexible sheets 18, 20 are kept in contact with a sector of the outer surface of the respective coupling rollers 24 and heat up in contact with the surface of the respective coupling rollers 24.

The heating units 34, 36 heat a sector of the coupling roller 24 having an angular extension comprised between 60° and 270°, preferably between 90° and 180°, in particular between 100° and 150°.

The heating units 34, 36 located inside the coupling rollers 24 may comprise heating elements 40 provided with electrical resistances, which heat the sector of the coupling rollers 24, and consequently the surface on which the flexible sheets 18, 20 rest. According to possible embodiments, the heating units 34, 36 may comprise heating elements 40 using a heated fluid, for example oil or air, as the heating medium.

In this case as well, the heating units 34, 36 are configured to heat the respective continuous flexible sheets 18, 20 to temperatures in the order of 60-100° C. and, preferably, between 70-80° C. The continuous flexible sheets 18, 20 are heated before overlapping the continuous flexible sheets 18, 20 on opposite sides of the continuous array of articles A, which advances towards the tangency area of the coupling rollers 24. After the overlapping of the heated continuous flexible sheets 18, 20 on opposite sides of the articles A, the continuous composite tape 26 thus formed is fed to the compression unit 28.

In this embodiment as well, the compression unit 28 may comprise a single pair of pressure rollers 30 (as illustrated in FIG. 2), or a first and a second pair of pressure rollers as shown in FIG. 1.

In a possible embodiment, said pressure rollers 30 may optionally comprise a heating element.

Figure 3A:
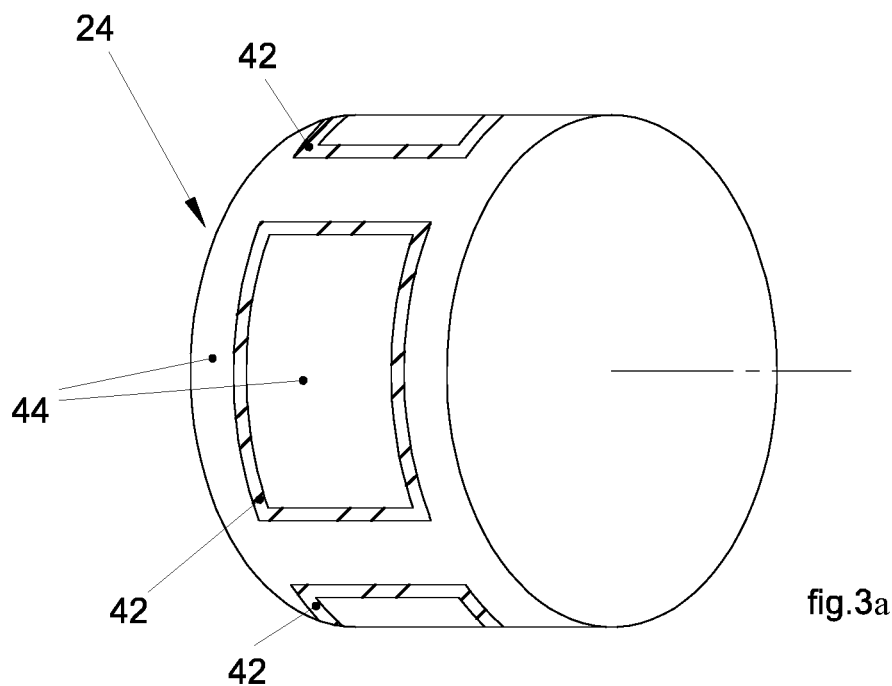
FIG. 3a is a schematic perspective view of the component indicated by the reference 50 in FIG. 2.

In a possible embodiment, the coupling rollers 24 of the overlapping unit 22 can be configured to only heat the respective continuous flexible sheets 18, 20 along the areas of the sheets 18, 20 that will be subjected to compression during the subsequent passage through the compression unit 28. With reference to FIG. 3a, in order to carry out the heating of the continuous flexible sheets 18, 20 only along the areas that will be subjected to compression, the coupling rollers 24 may have possibly protruding areas 42 on their outer surface, which are heated by electrical resistances surrounded by unheated areas 44. The areas 42 may have the same shape as the compression lines that are generated by the pressure rollers 30 of the compression unit 28, or the areas 42 may be shaped so that the shape of the compression areas is included in the shape defined by the areas 42.

As illustrated in FIG. 2, the pressure rollers 30 of the compression unit 28, and the coupling rollers 24 of the overlapping unit 22 are driven in phase with each other. The phase relationship between the pressure rollers 30 and the coupling rollers 24 of the overlapping unit 22 is controlled by an electronic control unit 46. A sensor 48 may also be provided, which provides the electronic control unit 46 with information on the location of where at least one of the continuous flexible sheets 18, 20 is heated to cause the pressure rollers 30 to apply pressure on the continuous flexible sheets 18, 20 exclusively along the heated areas. For example, the sensor 48 may detect an appropriate reference placed on at least one of the suitably prepared continuous flexible sheets 18, 20.

In the case wherein only one pair of pressure rollers 30 is provided, the shape of the compression areas of the pressure rollers 30 is substantially identical to the shape of the areas 42 provided on the coupling rollers 24.

The diameter of the coupling rollers 24 and the angle along which the contact between the continuous flexible sheets 18, 20 and the outer surface of the coupling rollers 24 takes place are dimensioned so as to obtain the required temperature of the continuous flexible sheets 18, 20 leaving the overlapping unit 22.

Figure 4:
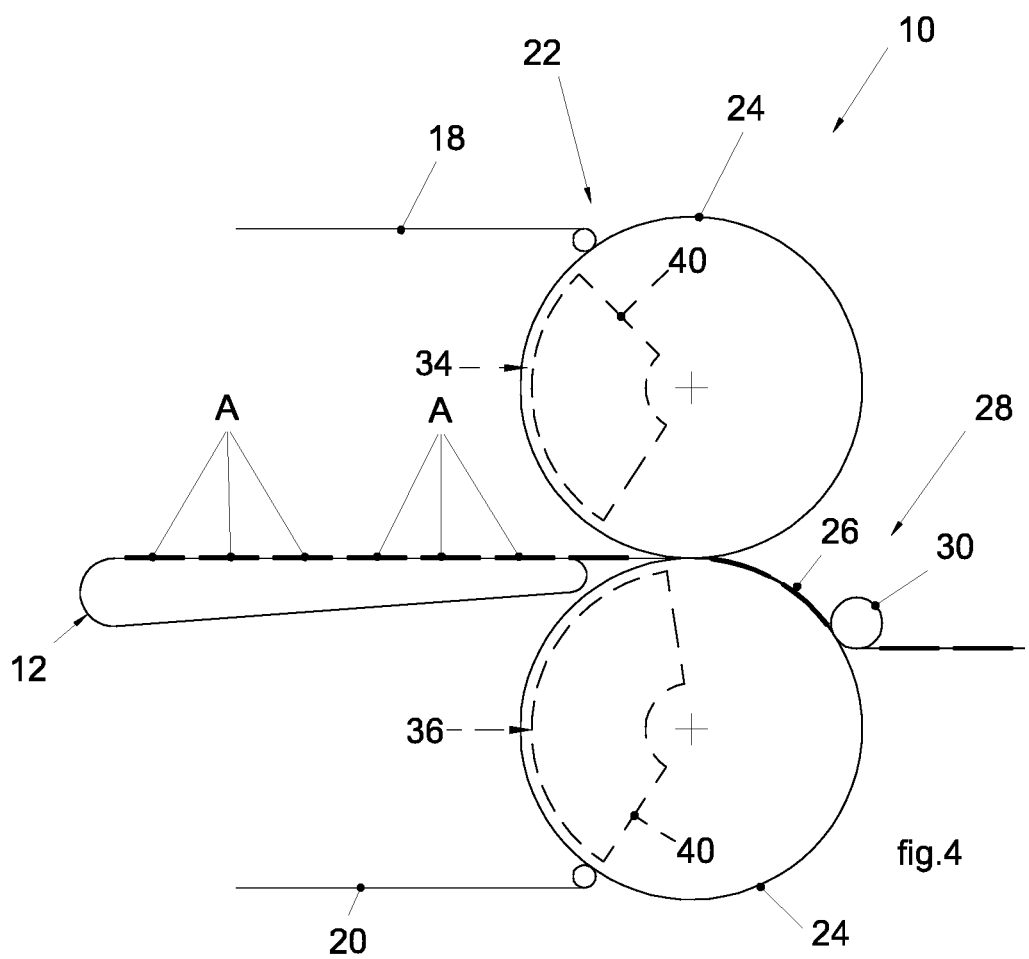

FIG. 4 illustrates a variant of the apparatus of FIG. 2. In this case as well, the elements corresponding to those previously described are indicated with the same numerical references.

In the variant of FIG. 4, the compression unit 28 comprises a pressure roller 30 that cooperates with the outer surface of one of the two coupling rollers 24. The continuous composite tape 26 leaves the overlapping area and continues on the surface of one of the two coupling rollers 24 (the lower roller in the example shown in FIG. 4) and is compressed between the pressure roller 30 and the outer surface of the coupling roller 24 along pressure lines surrounding each of the articles A.

In a possible embodiment, two pressure rollers 30 can be provided, both cooperating with the outer surface of the same coupling roller 24, wherein a first pressure roller 30 compresses the sheets 18, 20 along longitudinal lines, and the second pressure roller compresses the sheets 18, 20 along transversal lines.

In the apparatus of FIG. 4, the heating units 34 may be integrated into the coupling rollers 24 as in the embodiment of FIG. 2.

In possible embodiments of the apparatuses 10 described above, fixing of the two continuous flexible sheets 18, 20 around the articles A is obtained in the compression unit 28 by activating the thermally-activated adhesive.

According to possible embodiments, heating at least one of said sheets 18, 20 may comprise a preliminary heating of at least one of said sheets 18, 20 before compressing said sheets 18, 20 and a final heating of at least one of said sheets 18, 20 simultaneously to compressing said sheets 18, 20. In this way, thermal activation of the thermally-activated adhesive may be started in at least one heating unit 34, 36 and completed in the heating the compression unit 28.

According to possible embodiments, activation of the thermally-activated adhesive may be carried out completely in the at least one heating unit 34, 36, so that the compression unit 28 compresses the two continuous flexible sheets 18, 20 without further heating the already activated thermally-activated adhesive.

Figure 1B:
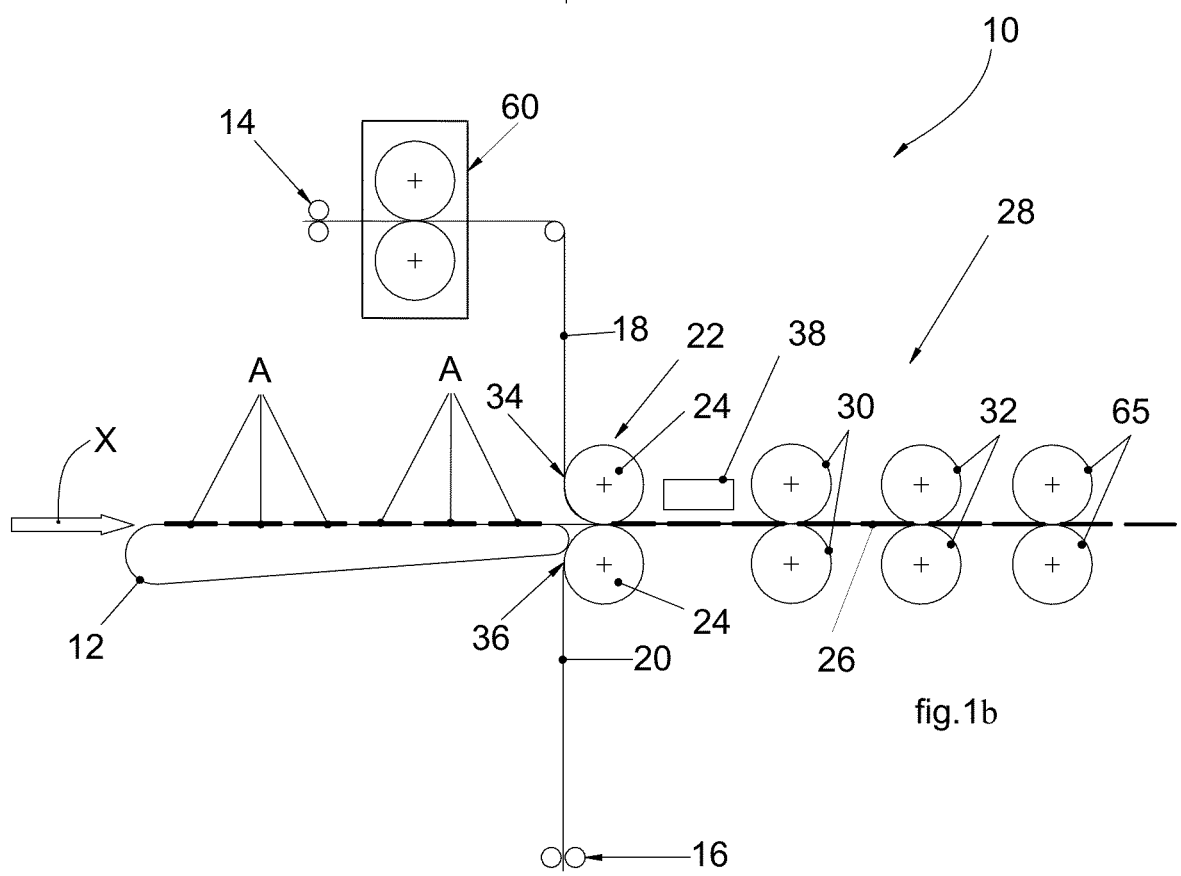

With reference to FIG. 1b, in an embodiment of the present invention the apparatus 10 may comprise an in-line dispenser 60 configured for applying dosed quantities of thermally-activated adhesive on one of the continuous sheets 18, 20 (on the sheet 18 in the example shown in FIG. 1b).

With reference to FIG. 1b, in a possible embodiment the apparatus 10 may comprise an additional heating source 38 (for instance an infrared heating source) placed between the overlapping unit 22 and the compression unit 28.

According to possible embodiments, the apparatus 10 may comprise a cutting unit 65 (FIG. 1b) downstream of the compression unit 28, which forms individual packages of the articles A from the continuous composite tape 26 by means of suitable cuts transversal to the feed direction between each pair of articles A.

Figure 3B:
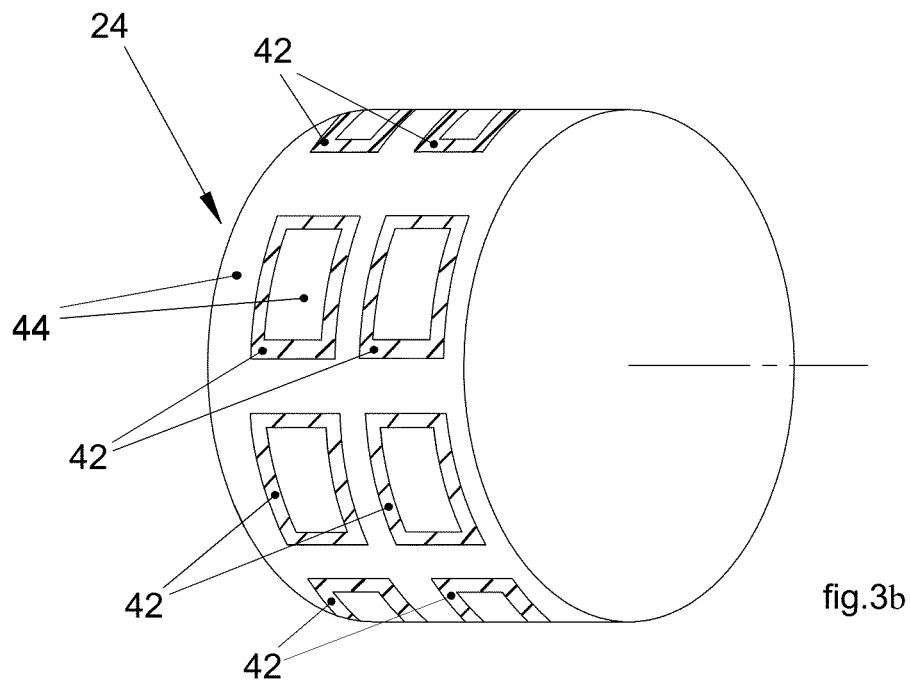
FIG. 3b is an alternative embodiment of the component shown in FIG. 3a, and FIG. 4 is a schematic view of a variant of the apparatus of FIG. 2.

In accordance with possible embodiments, the articles A to be packaged may be arranged in at least two rows advancing simultaneously through the overlapping unit 22. The overlapping unit 22 may be configured to apply two flexible sheets 18, 20 on opposite sides of the least two rows of articles A. In this case, as shown in FIG. 3b, at least one of the coupling rollers 24 may have on the outer surface at least two rows of heated areas 42 surrounded by unheated areas 44. The areas 42 may be shaped so that at least two articles A may be packaged simultaneously side by side.

All the previously described embodiments of the apparatuses 10 implement a method for the packaging of articles A comprising:

enclosing the articles A between two opposite flexible sheets 18, 20, at least one of which has a layer of thermally-activated adhesive on its surface facing the other sheet, compressing the sheets to fix the sheets together around the articles by means of the thermally-activated adhesive, and heating at least one of the flexible sheets 18, 20 before compressing the flexible sheets 18, 20.

The method involves thermal activation of the thermally-activated adhesive to fix the flexible sheets 18, 20 to each other during compression.

The method may envisage that the thermal activation of the thermally-activated adhesive is initiated by the heating of at least one of the flexible sheets 18, 20, for example, the one which has a layer of thermally-activated adhesive on one of its surfaces facing the other sheet, and is completed by heating during compression.

The method may envisage that the thermal activation of the thermally-activated adhesive is carried out completely by heating of at least one of the flexible sheets 18, 20, for example, the one which has a layer of thermally-activated adhesive on one of its surfaces facing the other sheet.

The method may envisage the heating of at least one of the flexible sheets 18, 20 before enclosing the articles A between the flexible sheets 18, 20.

The method may envisage the heating of at least one of the flexible sheets 18, 20 exclusively along areas of the sheet which are intended to be compressed.

The method may envisage that the flexible sheets 18, 20 are compressed exclusively around each of the articles A.

The method may envisage that one or both of the flexible sheets 18, 20 are heated on the respective face intended to be turned towards the articles A.

The flexible sheets 18, 20 may be heated to a temperature of between 60-100° C., preferably in the order of 70-80° C.

Heating of the flexible sheets 18, 20 may be carried out by passing the sheet or sheets to be heated in contact with the outer surface of a heated roller.

At least one of the flexible sheets 18, 20 may be kept in contact with a sector of the outer surface of a respective coupling roller 24 before said articles are enclosed between the two opposite flexible sheets 18, 20, thereby heating up the flexible sheet 18, 20. Said sector may have an angular extension comprised between 60° and 270°, preferably between 90° and 180°, in particular between 100° and 150°.

The flexible sheets 18, 20 may advance through the compression unit 28 at a speed of 150-250 m/min, in particular 180-210 m/min.

Of course, without prejudice to the principle of the invention, the details of construction and the embodiments can be widely varied with respect to those described and illustrated, without thereby departing from the scope of the invention as defined by the claims that follow.

The invention claimed is:

1. A method for packaging plasters, comprising:
   in a first step at a first station, enclosing said plasters between two opposite flexible sheets, at least one of which has thermally-activated adhesive on its surface facing the other sheet,
   in a second step, distinct and separate from said first step, compressing said sheets to peelably fix said sheets together around said plasters by means of said thermally-activated adhesive, wherein the second step is performed at a second station, which is downstream from and separate and distinct from the first station, and
   carrying out a preliminary heating of at least one of said sheets at the first station before compressing said sheets, and a final heating of said at least one of said sheets simultaneously to compressing said sheets at the second station.

2. The method of claim 1, wherein at least said preliminarily heating of the at least one of said sheets is carried out before enclosing said plasters between said sheets.

3. The method of claim 1, wherein at least one of said sheets is heated exclusively along areas of that sheet that are intended to be compressed and/or wherein said sheets are compressed exclusively around each of said plasters.

4. The method of claim 1, wherein both of said sheets are heated on respective faces that are opposite to faces intended to be facing towards said plasters.

5. The method of claim 1, wherein at least one of the sheets is kept in contact with a sector of an outer surface of a respective coupling roller before said plasters are enclosed between the sheets, thereby heating up the at least one of the sheets, and
   wherein said sector has an angular extension comprised between 60° and 270°.

6. The method of claim 1, wherein compressing said sheets includes advancing said sheets through a compression unit at a speed of 150-250 m/min.

7. An apparatus for packaging plasters, comprising:
   an overlapping unit configured to apply two flexible sheets on opposite sides of said plasters, so as to enclose said plasters between said sheets,
   a compression unit distinct and separate from and downstream of said overlapping unit, and configured to compress said sheets at compression areas to form a peelable seal, and
   a preliminary heating unit configured for heating at least one of said sheets before compressing said sheets and a final heating unit configured for heating at least one of said sheets at said compression unit, wherein the preliminary heating unit is separate and distinct from and upstream of the compression unit.

8. The apparatus of claim 7, wherein said preliminary heating unit is configured for heating at least one of said sheets before enclosing said plasters between said sheets.

9. The apparatus of claim 7, wherein said overlapping unit comprises two coupling rollers with respective axes parallel to each other and configured to apply said sheets on opposite sides of said plasters, and wherein said preliminary heating unit is arranged inside at least one of said coupling rollers.

10. The apparatus of claim 9, wherein at least one of said coupling rollers comprises one or more heating units, and wherein each of the one or more heating units heats a sector of the coupling roller having an angular extension comprised between 60° and 270°.

* * * * *